US012704584B2

(12) United States Patent
Singh et al.

(10) Patent No.: US 12,704,584 B2
(45) Date of Patent: Aug. 11, 2026

(54) SECURE TRAINING SEQUENCE CONFIDENCE LEVEL FIGURES OF MERIT FOR ULTRA-WIDEBAND HIGH-RATE PULSE OPTIMIZATION

(71) Applicant: Infineon Technologies AG, Neubiberg (DE)

(72) Inventors: Ajinder Pal Singh, Allen, TX (US); Daniel Lee, Salt Lake City, UT (US)

(73) Assignee: Infineon Technologies AG, Neubiberg (DE)

( * ) Notice: Subject to any disclaimer, the term of this patent is extended or adjusted under 35 U.S.C. 154(b) by 244 days.

(21) Appl. No.: 18/636,365

(22) Filed: Apr. 16, 2024

(65) Prior Publication Data

US 2025/0321312 A1 Oct. 16, 2025

(51) Int. Cl.
*G01S 5/02* (2010.01)

(52) U.S. Cl.
CPC .......... *G01S 5/0244* (2020.05); *G01S 5/0215* (2013.01)

(58) Field of Classification Search
CPC .... G01S 5/0244; G01S 5/0215; G01S 5/0218; G01S 13/0209; G01S 13/765
USPC .......................................................... 342/451
See application file for complete search history.

(56) References Cited

U.S. PATENT DOCUMENTS 8,155,097 B2 * 4/2012 Leung .................. H04W 52/24 455/67.11
8,184,038 B2 * 5/2012 Ekbal .................. G01S 13/765 342/450
8,244,185 B2 * 8/2012 Zhou .................. H04W 24/10 375/267
10,064,012 B1 * 8/2018 Boston .................. G01S 1/0428
10,942,249 B2 * 3/2021 Ding .................. G01S 5/0231
11,184,153 B2 11/2021 Hammerschmidt et al.
11,729,037 B2 * 8/2023 Hammerschmidt .................. H04L 27/0006 375/262
11,792,058 B1 10/2023 Kim et al.
11,800,483 B2 * 10/2023 Gunnarsson .......... G01S 5/0244
11,933,874 B2 3/2024 Han et al.
12,019,139 B2 6/2024 Kang et al.
12,212,984 B2 * 1/2025 Wei .................. H04B 17/309

(Continued)

FOREIGN PATENT DOCUMENTS

EP 1647098 B1 * 2/2007 ......... H04L 27/0004
WO WO-2009044994 A1 * 4/2009 ........... H04B 1/7163

OTHER PUBLICATIONS

Notice of Allowance dated Feb. 3, 2026, for U.S. Appl. No. 18/678,080.

(Continued)

*Primary Examiner* — Nuzhat Pervin
(74) *Attorney, Agent, or Firm* — Eschweiler & Potashnik, LLC

(57) ABSTRACT

Systems, methods, and devices are provided for controlling processing of ultra-wideband (UWB) secure training sequence (STS) signals based on previously received UWB STS signals. In one example, a controller device is configured to receive data derived from at least one secure training sequence (STS) confidence level figure of merit (STS CLFOM data), wherein the STS CLFOM data is based on a correlation between a UWB signal received by a first UWB receiver device and a reference STS template; and control processing of subsequently received UWB signals based on the data.

20 Claims, 6 Drawing Sheets

(56) References Cited

U.S. PATENT DOCUMENTS 12,306,284 B2 * 5/2025 Han ........................ H04W 4/70
12,355,484 B2 * 7/2025 Reddy .................. H04B 1/7183
12,418,321 B2 * 9/2025 Wahl .................... H04W 64/00
2017/0123039 A1 * 5/2017 Shin .......................... G01S 5/10
2018/0254870 A1 * 9/2018 Dutz .................... H04L 5/0051
2018/0254925 A1 * 9/2018 Dutz .................... H04B 1/7183
2019/0037549 A1 * 1/2019 Xu ...................... H04L 25/0224
2019/0074930 A1 * 3/2019 Küchler ................ H04L 1/0041
2019/0195981 A1 * 6/2019 Ding ......................... G01S 5/04
2019/0273636 A1 * 9/2019 Batra ..................... H04B 1/711
2020/0014526 A1 * 1/2020 Hammerschmidt ......................... H04L 25/0224
2020/0228943 A1 * 7/2020 Martin ...................... G01S 5/02
2021/0288688 A1 * 9/2021 Hollar ............... H04W 56/0015
2022/0066010 A1 * 3/2022 Henry ................... H04W 76/15
2022/0070816 A1 * 3/2022 Henry ....................... G01S 5/14
2022/0140971 A1 * 5/2022 Hammerschmidt .. H04L 5/0092 370/329
2022/0141076 A1 * 5/2022 Hammerschmidt .. H04L 5/0098 375/262
2022/0179035 A1 * 6/2022 Zhang ................. G01S 5/02213
2022/0295430 A1 9/2022 Schober et al.
2023/0276401 A1 * 8/2023 Reddy ................... H04W 64/00 455/456.1
2023/0276403 A1 * 8/2023 Reddy ............... H04W 56/0015 455/456.1
2024/0077574 A1 * 3/2024 Joo ..................... G01S 13/0209
2024/0098677 A1 * 3/2024 Takeda .................. H04W 64/00
2024/0219548 A1 * 7/2024 Han ....................... G01S 5/0284
2024/0259121 A1 * 8/2024 Wang ................... H04B 17/391
2025/0023685 A1 * 1/2025 Zhang .................... H04B 7/024
2025/0039860 A1 * 1/2025 Reddy ................. H04W 74/002
2025/0081156 A1 * 3/2025 Shin ...................... H04W 64/00

OTHER PUBLICATIONS

Giridhar Mandyam et al. "The Power to be Precise. UWB Secure Ranging in FiRa." Published in Aug. 2022.

Patrick Leu et al. "Ghost Peak: Practical Distance Reduction Attacks Against HRP UWB Ranging".

Frank Leong et al. IEEE P802.15 Wireless Personal Area Networks. Published Jul. 2018.

Dieter Coppens et al. An Overview of UWB Standards and Organizations (IEEE 802.15.4, FiRa, Apple): Interoperability Aspects and Future Research Directions. Published Jun. 29, 2022.

Mridula Singh et al. "Security Analysis of IEEE 802. 154z/HRP UWB Time-of-Flight Distance Measurement".

Non-Final Office Action dated Sep. 24, 2025, for U.S. Appl. No. 18/678,080.

* cited by examiner

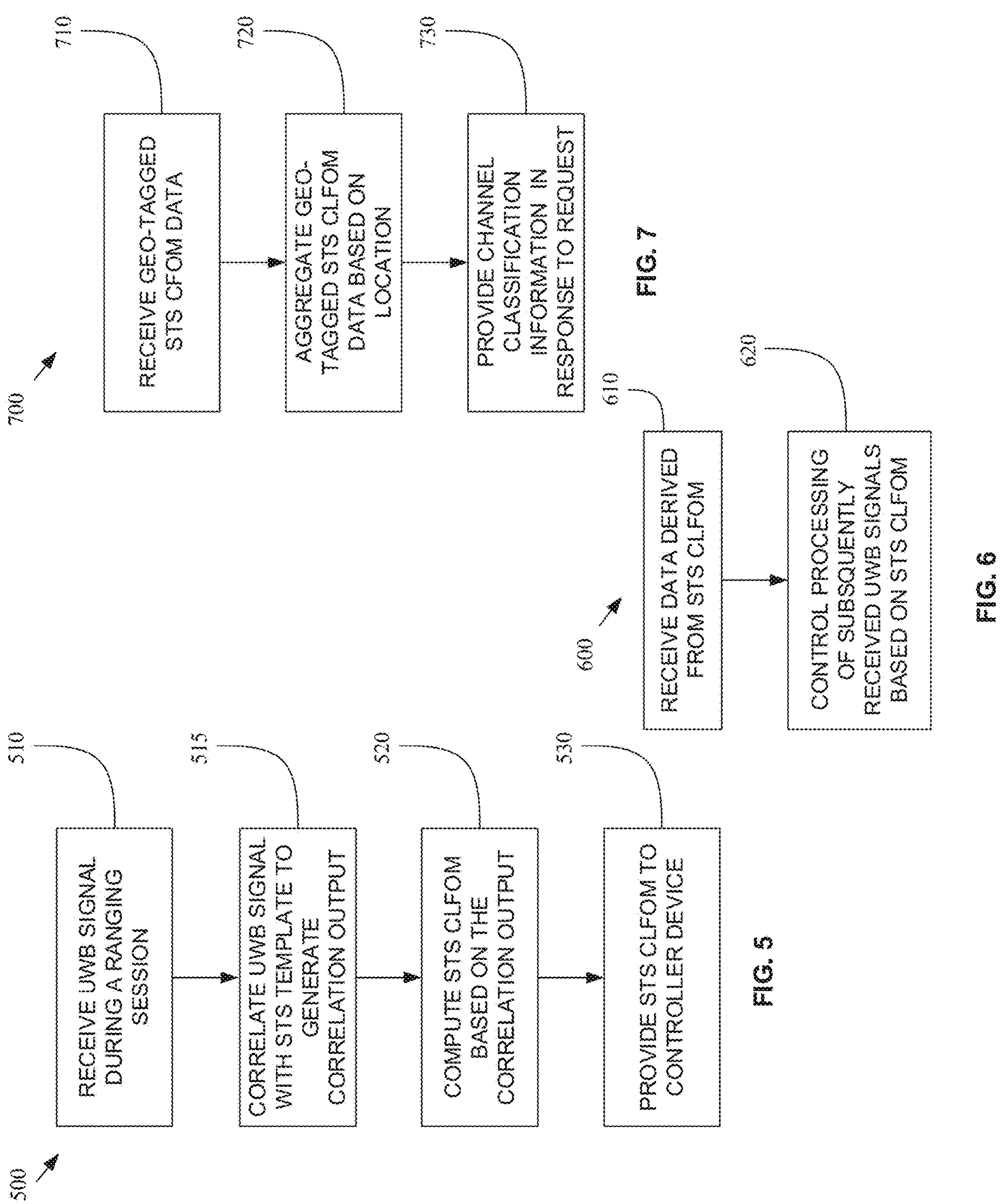
700
RECEIVE GEO-TAGGED STS CFOM DATA
710
AGGREGATE GEO-TAGGED STS CLFOM DATA BASED ON LOCATION
720
PROVIDE CHANNEL CLASSIFICATION INFORMATION IN RESPONSE TO REQUEST
730
FIG. 7
600
RECEIVE DATA DERIVED FROM STS CLFOM
610
CONTROL PROCESSING OF SUBSQUENTLY RECEIVED UWB SIGNALS BASED ON STS CLFOM
620
FIG. 6
500
RECEIVE UWB SIGNAL DURING A RANGING SESSION
510
CORRELATE UWB SIGNAL WITH STS TEMPLATE TO GENERATE CORRELATION OUTPUT
515
COMPUTE STS CLFOM BASED ON THE CORRELATION OUTPUT
520
PROVIDE STS CLFOM TO CONTROLLER DEVICE
530
FIG. 5

SECURE TRAINING SEQUENCE CONFIDENCE LEVEL FIGURES OF MERIT FOR ULTRA-WIDEBAND HIGH-RATE PULSE OPTIMIZATION

FIELD

The present disclosure relates generally to the field of processors and in particular to processors for ultra-wideband (UWB) signals

BACKGROUND

Ultra-wideband signals are well suited for secure ranging techniques because these signals enable accurate distance measurement between devices.

BRIEF DESCRIPTION OF THE DRAWINGS

Some examples of circuits, apparatuses and/or methods will be described in the following by way of example only. In this context, reference will be made to the accompanying Figures.

FIG. 5 is a flow diagram outlining an exemplary method of computing an STS CLFOM, in accordance with various aspects described.

FIG. 6 is a flow diagram outlining an exemplary method of controlling processing of UWB signals based on STS CLFOM data, in accordance with various aspects described.

FIG. 7 is a flow diagram outlining an exemplary method of aggregating STS CLFOM data to generate channel condition information, in accordance with various aspects described.

DETAILED DESCRIPTION

Figure 1:
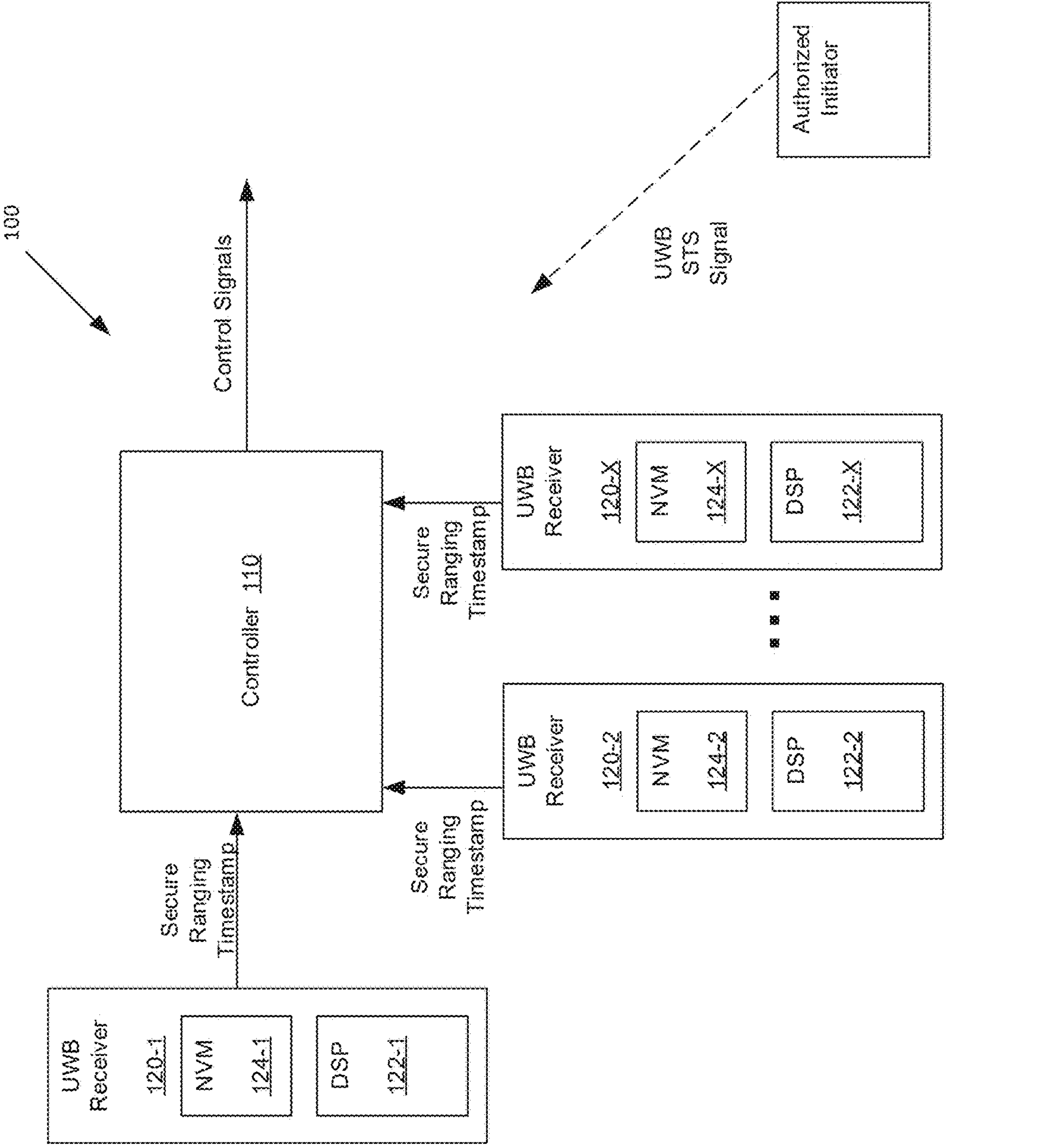
FIG. 1 is a block diagram of an exemplary access control system that analyzes received UWB secure training sequence (STS) signals to determine whether an authorized user is proximate to a controller.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Secure ranging is the process of precise detection of the distance between a radio transmitter and receiver. If the distance between the transmitter and the receiver is within a pre-specified limit, then some form of authorization, usually in the form of physical access, such as unlocking a door, may be performed by the receiver. Ultra-wideband (UWB) radio technology has seen increased adoption in secure ranging due to the waveform's ability to support accurate Time-of-Flight (ToF) estimation and therein a determination of relative position.

UWB secure ranging solutions may follow the IEEE 802.15.4z ranging standard, which was finalized in 2020. This standard enhanced the existing IEEE802.15.4a ranging standard with new integrity features, allowing more precise and secure ranging. Another relevant standard is the Car Connectivity Consortium CCC standard which provides an industry standard for secure ranging between UWB receiver devices installed in automobiles and initiator devices such as fobs or smartphones.

IEEE 802.15.4z standardizes two modes of ranging operation: Low-Rate Pulse (LRP) and High-Rate Pulse (HRP). Packet formats, implementation, and security of LRP and HRP differ. The differences between LRP and HRP are primarily due to UWB being a wide band technology. To limit interference, regulators restrict the output power of UWB receiver devices in proportion to their communication rate. Under these regulations, as the pulse rate increases, the maximum allowed transmission power per pulse should decrease. LRP pulses may therefore be transmitted at a higher power than HRP pulses, and in many scenarios individual pulses can be detected and decoded by the receiver.

In contrast, due to the lower transmission power of HRP pulse, in many application scenarios individual HRP pulses may not detectable by the receiver. HRP mode thus requires that the energy is split up into many pulses to transmit information successfully. The security concept of HRP reflects the fact that HRP pulses are low power and to enhance security, HRP pulses encode what is referred to as a random secure training sequence, a scrambled time sequence, or a scrambled timestamp sequence (referred to interchangeably as STS). The STS may be up to 4096 HRP pulses long and is transmitted in a packet by the initiator. The receiver detects the STS through autocorrelation with a stored reference STS template. Typically, one of the correlation peaks is used to determine the time of arrival of the packet. Contrary to LRP where the polarity of each pulse is detected, HRP receivers calculate some aggregate statistic over the received pulses in order to determine the time of arrival (ToA) of a transmitted UWB STS signal.

FIG. 1 illustrates a secure ranging system 100 that includes a controller 110 and several UWB receiver devices (e.g., anchors) 120-1 through 120-X. As will be seen in FIG. 2, the controller and/or each of the UWB receiver devices may be implemented on separate system on chips (SoCs). Each UWB receiver device includes a digital signal processing (DSP) processor 122 and non-volatile memory (NVM) 124. The DSP processor 122 includes one or more cores and is configured to correlate a received UWB STS signal with a reference STS template stored in the NVM. The reference STS template is derived from a pre-derived UWB Ranging round key (URSK), which is derived from a key seed by a Key Derivative Function of the UWB receiver device and by a negotiated STS frame index. The UWB receiver device 120 determines a secure ranging timestamp based on a correlation of the received signal and the template and provides the secure ranging timestamp to the controller. The secure ranging timestamp encodes a time of arrival of the STS packet. The controller 110 may determine the position of the authorized initiator based on a difference between the secure ranging timestamps from the multiple UWB receiver devices 120-1 through 120-X. When the determined position is within the prescribed radius of the controller, the controller 110 provides one or more control signals to other components. The control signals may cause actuation of selected components, such as a vehicle's door lock, a garage door, comfort or entertainment features, and so on, in response to an authorized person approaching the secure ranging system.

As per IEEE 802.15.4z, in a ranging round the UWB receiver device 120 computes a computed channel impulse response ($\widehat{CIR}$) for a received UWB STS signal by correlating the incoming signal with a locally stored reference STS template (e.g., stored in NVM 124). Based on the computed $\widehat{CIR}$, the UWB receiver device can determine the time of arrival (ToA) of the UWB STS signal, which is in turn reported to the controller 110 as a secure ranging timestamp. In other words, having received the UWB STS signal, the signal after the receiver is $$RX(t) = STS(t) * CIR(t) \qquad \text{EQ1}$$

Then the UWB receiver device computes $$\widehat{CIR}(t) = RX(t) *^{-1} STS_{local(t)} \qquad \text{EQ2}$$

where $STS_{local(t)}$ is the stored reference STS template.

Figure 2:
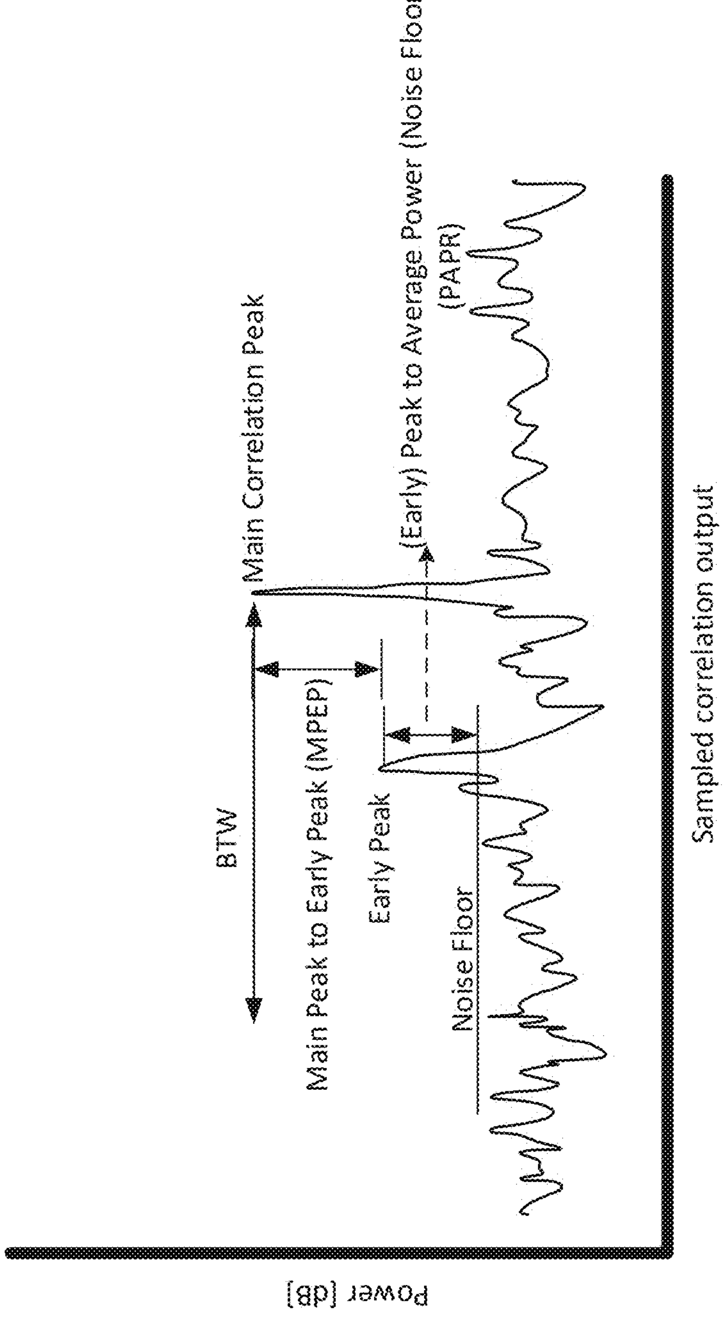
FIG. 2 illustrates an exemplary sampled correlation output.

FIG. 2 illustrates an example sampled correlation output computed based on a received UWB STS signal. The sampled correlation output may be the output of a correlation operation performed by a DSP core 122 of FIG. 1. An early peak, a main or maximum peak, and a noise floor are labeled in the sampled correlation output. The main correlation peak does not always represent the direct path between the two ranging devices, which is the path that best indicates the distance between the ranging devices. This can occur when the ranging devices are not within line-of-sight of each other, or an indirect path experiences constructive interference leading to a higher peak than the direct path. Therefore, the UWB receiver device considers any peak above the noise floor as a possible candidate for distance estimation. Once the UWB receiver device detects a peak of a certain magnitude the UWB receiver device then performs a comparison with any other peaks in the vicinity that originate from a different, but shorter path. The time window that specifies the search region is referred to as a back-search time window (BTW).

The UWB secure ranging process relies on an accurate estimate of the noise floor on the communication channel in order to determine if a correlation peak stems from the transmitted STS signal or is an artifact of the channel. If the noise floor estimate is too high, the UWB receiver device might misclassify lower-amplitude peaks generated by a non-line-of-sight path as noise. However, a noise floor estimate that is too low may lead to misidentifying noise as correlation peaks associated with the transmitted STS signal, which can degrade the accuracy of the determined ToA.

The UWB receiver device detects peaks based on peak detection thresholds, which specify how far peaks stand out with respect to the noise floor. Due to multi-path, the correlation of the incoming signal with the reference STS template can produce many correlation peaks at different points in time and with varying amplitudes. Peak power for all the correlation peaks as observed by the UWB receiver device during the BTW is analyzed by the UWB receiver device against the peak detection thresholds.

Having computed correlation between the received STS signal and the reference STS template, the receiver has compiled a set of (arrival-time (ToA), power (P) pairs defined in correlation-space S as $$S = \{(ToA_0, P_0), \ldots, (ToA_n, P_n)\}$$

From amongst these peaks, the UWB receiver device identifies the earliest peak as a true STS peak if certain criteria are met. One such criterion is that the difference between the peaks does not exceed a maximal peak to early peak ratio (MPEP) threshold. Another criterion is a minimum peak to average power ratio (PAPR) which is the ratio between the power of the early peak and the noise floor. This criterion ensures that the chosen peak sufficiently exceeds the noise floor.

Thus, many factors are taken into consideration to identify the correlation peak that corresponds to the true distance between the transmitter and receiver. The length of the back-search time window (BTW), the estimated noise floor, and peak detection thresholds are examples of configurable secure ranging parameters whose values affect the performance and accuracy of STS detection. These secure ranging parameters may be tweaked over time by learning a given channel over time. Adjusting the secure ranging parameters based on a derived channel quality such as a number of potentially interfering devices or security (e.g., a busy parking lot vs. a home garage) may allow for increased ranging performance when security and interference are not a major factor. As will be discussed in more detail below, the secure ranging parameters may be adjusted over time as different aspects of a channel (mapped to a geographic location) are learned. This enables the optimization of power and performance versus security based on the derived STS learnings for a given set of channels.

Further, secure ranging parameters may be selected based on learned channel characteristics of a given geographic location. For example, a controller learns (e.g., with assistance from a cloud-based service) that the current environment is typically noisy, the controller may send data to the UWB receiver devices indicating that the noise floor is to be assumed to be higher than in other locations. In response, the UWB receiver device may adjust the algorithm used to detect peaks to use a higher secure ranging parameter value for the noise floor. This means that a figure of merit of the confidence level becomes larger at given UWB signal peaks and given actual noise as compared to quieter locations.

Figure 3:
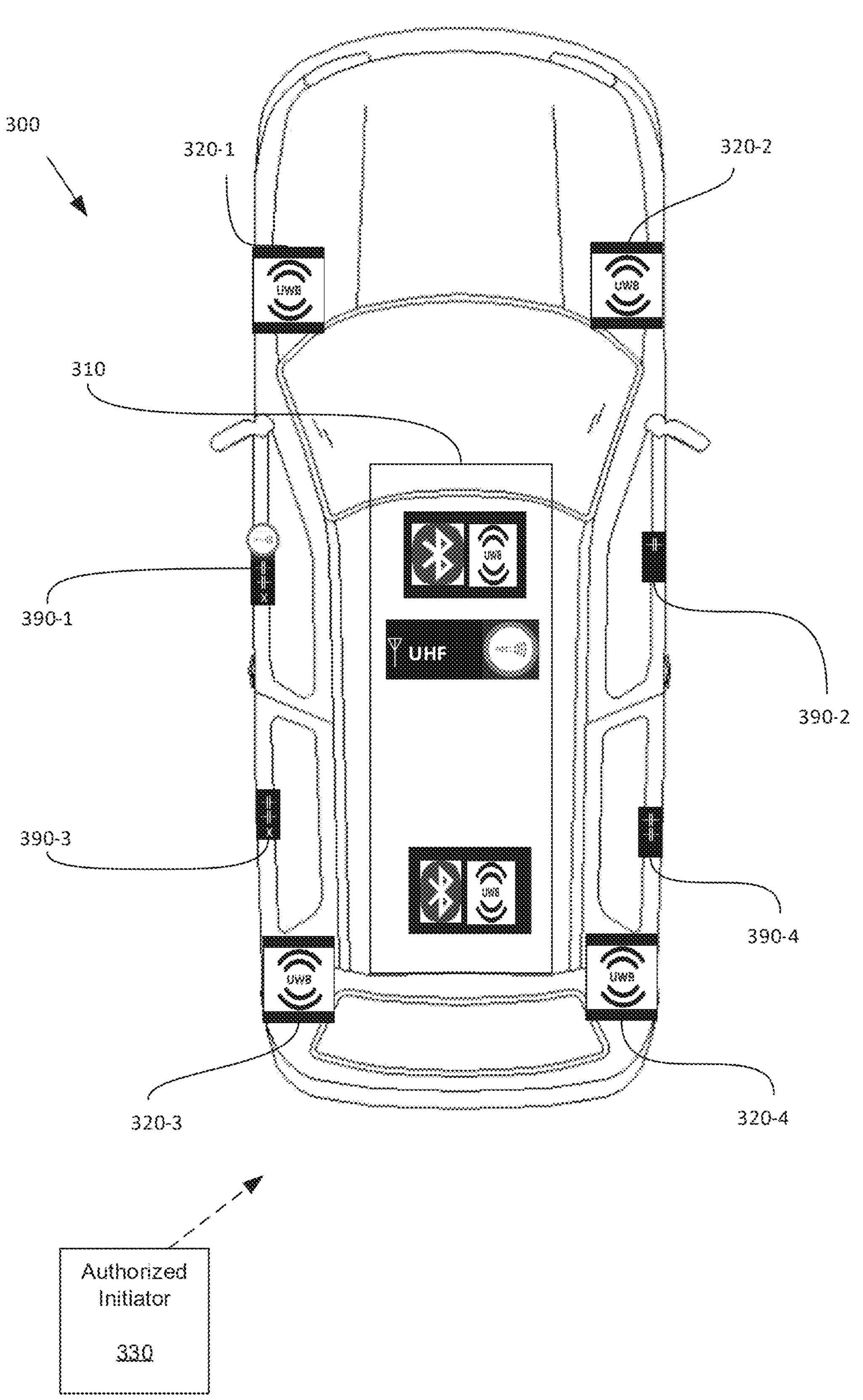
FIG. 3 is a block diagram of a vehicle access control system.

FIG. 3 is a block diagram of an exemplary vehicle access control system 300. In this particular example of an access control system, a vehicle includes a body domain controller (BDC) 310, four door handles 390-1,390-2,390-3,390-4, and four anchor devices 320-1,320-2,320-3,320-4. The body domain controller 310 performs similar functions to the controller 110 and 410 of FIGS. 1 and 4. The anchor devices 320 perform similar functions to the UWB receiver devices 120 and 420 of FIGS. 1 and 4. The anchor devices 320 are UWB transceivers.

The system 300 includes at least one authorized initiator device 330 such as a key fob, a smart card, or a smartphone with an access application installed. During an initiation process, URSK secrets are derived and stored in a secure enclave of the anchor devices 320 and the authorized initiator device 330. The reference STS template will be derived from the USRK secrets and will be used to correlate the received STS signal with the reference STS template. The authorized initiator device 330 uses the reference STS template to generate a UWB STS signal that is transmitted toward the vehicle access control system 300.

Each UWB anchor device 320 receives and processes a UWB STS signal as described with reference to FIG. 2 to determine a secure ranging time stamp that indicates a ToA of the UWB STS signal at the anchor device 320. The secure ranging timestamp is transmitted to the body domain controller 310, which uses the secure ranging timestamps from one or more of the anchor devices 320 to determine whether the authorized initiator device 330 is within a predetermined secure range of the vehicle access control system 300. When the body domain controller 310 determines that the authorized initiator device 330 is within range of the system 300, the body domain controller transmits an access signal to one or more of the door handles 390 to actuate components that unlock the door handle(s). The vehicle access control system 300 of FIG. 3 is just one example of access control systems that may benefit from the STS confidence level figure of merit techniques disclosed herein.

Due to their higher repetition frequency and relatively low power, HRP pulses can be severely affected by noise and in addition channel artifacts lead to inter-pulse interference. However, securing HRP based secure ranging systems against distance shortening attacks and potential interfering signals significantly degrades performance.

Described herein are systems methods and techniques for generating STS confidence level figures of merit (STS CLFOM) that quantify some aspect of a secure ranging round. STS CLFOM may, for example, indicate a confidence level related to the quality of a channel in which an STS signal is received (e.g., interference level, obstacles, and so on). STS CLFOM may be tagged with a geographic location in which the associated secure ranging round was performed. In this manner the STS CLFOM may be used to optimize the performance of HRP secure ranging in quiet locations (e.g., high transmission quality), such as a home garage. The STS CLFOM may be used to enhance the performance of the STS signal detection process in locations in which good quality channel conditions have been detected.

Figure 4A:
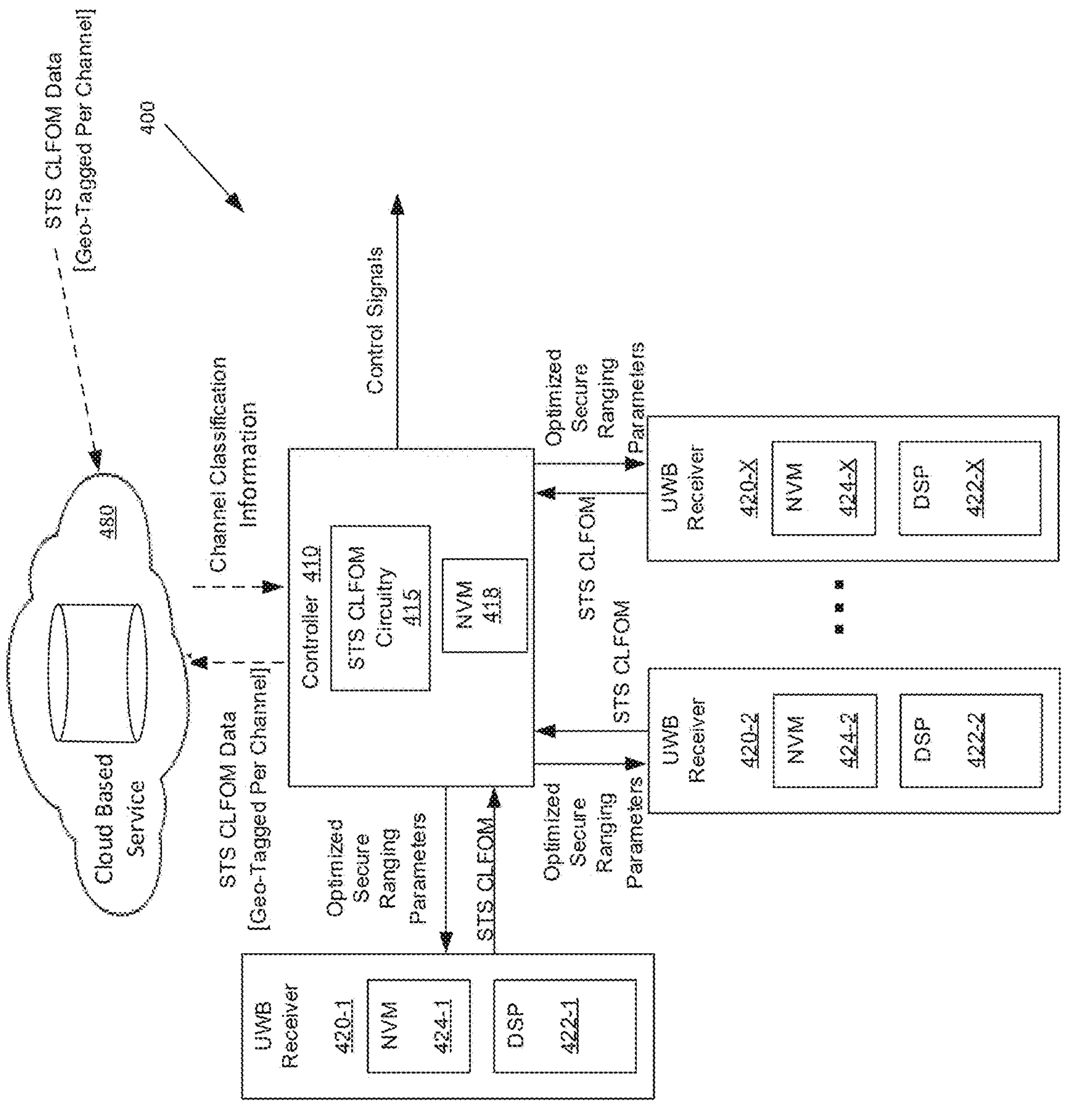
FIG. 4A and FIG. 4B are block diagrams of exemplary access control systems that control processing of UWB signals based on one or more STS confidence level figures of merit (STS CLFOM), in accordance with various aspects described.

FIG. 4A is a block diagram of an exemplary access control system 400 in which UWB receiver devices 420 compute one or more STS CLFOM that characterize some aspect of a secure ranging process. The STS CLFOM are provided to a controller 410. The controller 410 includes STS CLFOM circuitry 415 that stores and analyzes the STS CLFOM for use in subsequent processing of UWB STS signals. For example, based on STS CLFOM, the STS CLFOM circuitry 415 may determine optimized secure ranging parameters (e.g., noise floor level, peak detection threshold, and so on) for use by the UWB receiver devices in determining a secure ranging timestamp and/or may adapt parameters used in generating the control signals as will be described in more detail below.

Additionally, the STS CLFOM circuitry 415 may geo-tag received STS CLFOM and/or STS CLFOM data derived from the received STS CLFOM with an indication of a geographic location in which the STS CLFOM was generated. In this manner, stored STS CLFOM or STS CLFOM data may be mapped to particular geographic locations for use in processing subsequent UWB STS signals received when the controller 410 returns to a previously visited location. The STS CLFOM circuitry 415 may determine the geographic location of the system 400 based on a location associated with a network to which the access system is proximate (e.g., based on network-identifying signals) or connected (e.g., home WiFi network or cellular network cell).

A particular technique for computing an STS CLFOM will now be disclosed in some detail. Many of the disclosed techniques are applicable to any other STS CLFOM that characterizes some aspect of a secure ranging round.

An exemplary STS CLFOM characterizes a quality of the channel in which a UWB STS signal is received, in terms of interference or noise level. In some examples, a DSP processor 422 of each UWB receiver device 420 computes the channel quality STS CLFOM based on a correlation error between a received UWB STS signal and the reference STS template. In one particular example, the channel quality STS CLFOM is a function that generates a value based on the correlation error, a main peak to early peak (MPEP) differential of the correlation output, an early peak to noise floor or PAPR differential of the correlation output, and a noise floor of the correlation output.

The correlation error may be derived from processing $$\widehat{CIR}(t) = RX(t) *^{-1} STS_{local(t)}$$

and determining a difference between the estimated channel impulse response and an ideal channel impulse response.

The MPEP differential may be derived by processing the correlation space as $$S = \{(ToA_0, P_0), \ldots, (ToA_n, P_n)\}$$

wherein $$\frac{P_{main\_peak}}{P_{average\_power}} < MPEP.$$

The early peak to noise floor differential or PAPR differential may be derived by processing the correlation space as $$S = \{(ToA_0, P_0), \ldots, (ToA_n, P_n)\}$$

wherein $$\frac{P_{main\_peak}}{P_{average\_power}} \geq PAPR.$$

The noise floor may be derived by processing the correlation space as $$S = \{(ToA_0, P_0), \ldots, (ToA_n, P_n)\}$$

The correlation error, MPEP differential, PAPR differential, and noise floor of the correlation output for each ranging round are stored in the NVM 424 and used to compute the channel quality STS CLFOM. The channel quality STS CLFOM is a function of the correlation error, MPEP differential, PAPR differential, and noise floor of the correlation. The function may vary depending on the channel. The channel quality STS CLFOM may be provided to the controller 410 which may aggregate the channel quality STS CLFOM received from different UWB receiver devices 420 may be geo-tagged and aggregated to generate an overall channel quality STS CLFOM for a particular channel/geographic location. Optimized secure ranging parameters such as a back-search time window, estimated noise floor, or peak detection thresholds may be determined by the STS CLFOM circuitry 415 based on the received channel quality STS CLFOM. When the system 400 returns to a location mapped to a given channel quality STS CLFOM, previously computed optimized secure ranging parameters may be provided to the UWB receiver devices 420 for use adapting parameters used in secure ranging.

For example, a relatively high channel quality STS CLFOM may result in modification of secure ranging parameters such as lowering of the estimated noise floor or peak detection thresholds. This may improve the performance of the secure ranging process and reduce power consumption. On the other hand, a relatively low channel quality STS CLFOM may result in a different modification of secure ranging parameters such as increasing of the estimated noise floor or peak detection thresholds in anticipation of a lower quality channel at the expense of additional ranging rounds and increased power consumption. Optimized secure ranging parameters may be determined by the controller 410 based on the channel quality STS CLFOM. Alternatively, the optimized secure ranging parameters may be computed by the cloud based service and provided to the controller 410 based on the a location of the system 400. In either case, the controller 410 provides the optimized secure ranging parameters to the UWB receiver devices 420.

In some examples, the controller 410 may transmit geo-tagged STS CLFOM data to a cloud-based service 480 that aggregates geo-tagged STS CLFOM data for many vehicles or access systems based on geographic location. The cloud-based service 480 may use artificial intelligence or machine learning techniques to analyze the received STS CLFOM data for each location and generate channel classification information for each location. The cloud-based service 480 may determine historic trends or make projections of channel behavior based on the received STS CLFOM data. Subscribers to the cloud-based service may retrieve channel classification information for a given location for use in processing UWB STS signals while at the location. The channel classification information may be, for example, an indication of the quality (e.g., level of interference such as QUIET, MODERATE, NOISY) of the UWB channel at the location. The controller 410 may optimize secure ranging parameters used by the UWB receiver devices 420 based on the received channel classification information instead of or in addition to STS CLFOM received from UWB receiver devices 420.

In some examples, a DSP processor 422 of each UWB receiver device 420 computes the STS CLFOM for each secure ranging round. In some examples, selected STS CLFOM, average STS CLFOM, and so on may be saved in NVM 424 or NVM 418. The DSP processor 422 may be configured to determine an STS CLFOM for every secure ranging round, on a periodic basis, in response to a control signal from the controller, or in response to an occurrence of certain trigger criteria. The rate at which STS CLFOM are generated by UWB receiver devices 420 and/or provided to the SLS CLI circuitry 415 may vary between different STS CLFOM.

STS CLFOM or STS CLFOM data may be stored on a short term basis in NVM 418 of the controller 410. For example, STS CLFOM or STS CLFOM data may be stored for as long as a given signing key is active. Geo-tagged STS CLFOM or STS CLFOM data may be stored on a long term basis by the cloud-based service 480. Certain STS CLFOM may not be stored for as long as others.

Additionally, aggregated channel quality STS CLFOM data may be analyzed by either the controller 410 or the cloud based service 480 to identify trends in channel quality for different locations. This trend information may be useful to identify locations in which channel quality is degraded so that, for example, remedial action may be taken or recommended.

Figure 4B:
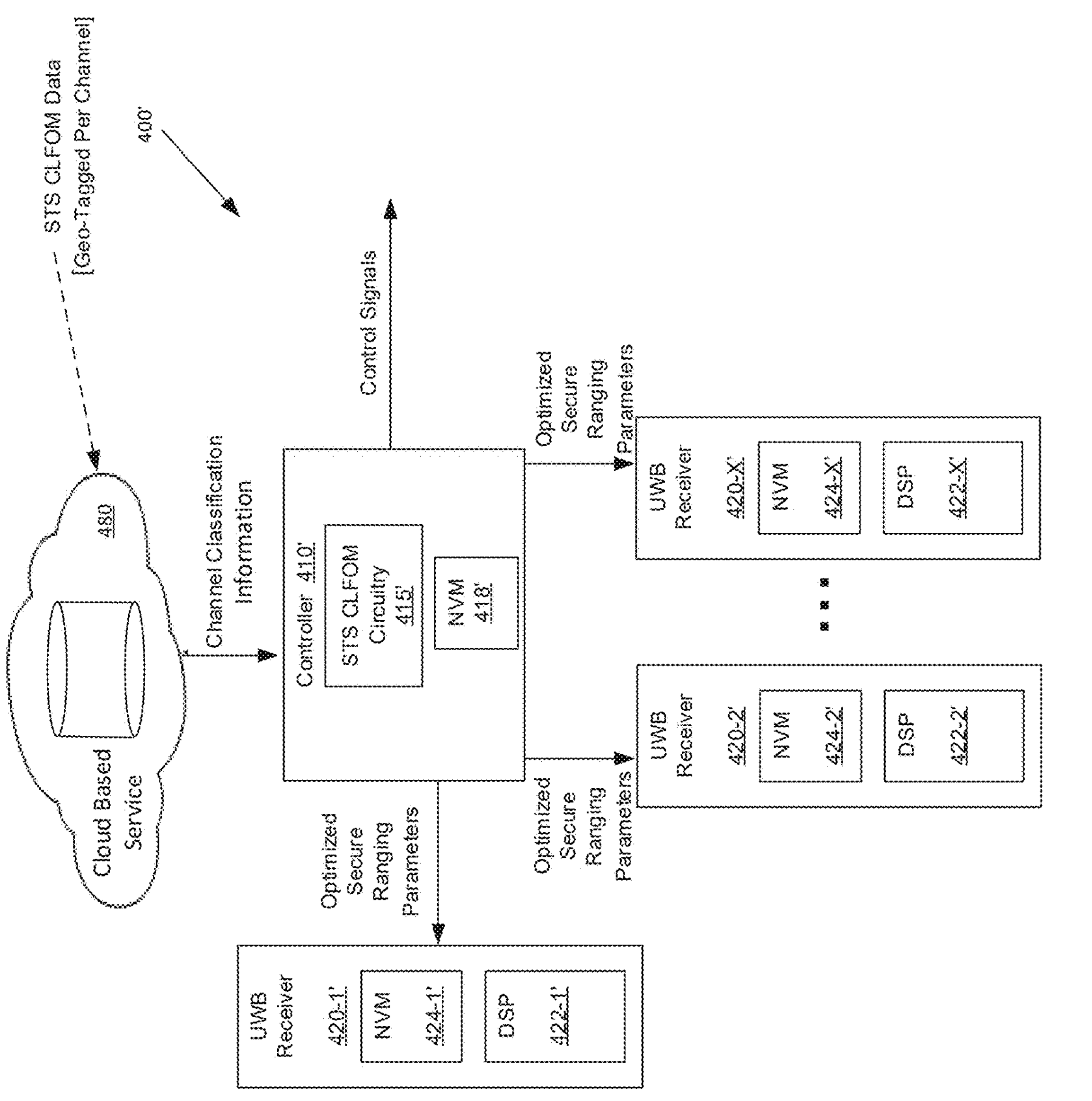

FIG. 4B is a block diagram of another exemplary access control system 400' in which the UWB devices 420' do not compute STS CLFOM. Rather, the controller 410' requests channel classification information for its present location from the cloud-based service 480 and the STS CLFOM circuitry 415' determines optimized secure ranging parameters for use by UWB receiver devices 420' based on the received channel classification information. In this manner, access control systems that do not support the computation of STS CLFOM may still benefit from optimized secure ranging parameters based on learning (e.g., STS CLFOM) performed by other access control systems.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

FIG. 5 is a flow diagram outlining an exemplary method 500 for computing an STS CLFOM for a secure ranging round. The method may be performed, for example, by DSP processors 122 or 422 of FIGS. 1 and 4A/4B, respectively or anchor devices 320 of FIG. 3. At 510, a UWB signal is received during a ranging round. The method includes, at 515, correlating the received UWB signal with a secure training sequence (STS) template to generate a correlation output for a channel in which the UWB signal is received.

An example correlation output is illustrated in FIG. 2. At 520, at least one STS CLFOM is computed for the ranging round based on the correlation output. The STS CLFOM characterizes an aspect of a particular secure ranging round performed by a UWB receiver device, such as an anchor. The method includes, at 530, providing the at least one STS CLFOM to a controller device. The controller device may be, for example, a controller 110, 410 of FIGS. 1 and 4A/4B, respectively, or a body domain controller (BDC) installed in a vehicle (see FIG. 3).

One example STS CLFOM is a channel quality STS CLFOM that characterizes a level of interference or noise that is present in a channel in which an STS UWB signal is received. In this example, the method includes computing the channel quality STS CLFOM based on a function of a correlation error of the correlation output, a main peak to early peak (MPEP) differential of the correlation output, an early peak to noise floor differential of the correlation output, and a noise floor of the correlation output.

In some examples, the method includes providing the data indicative of the STS CLFOM in each ranging round, on a periodic basis, in response to a request from the controller, or in response to a trigger condition being met. The method may include storing the data indicative of the confidence level figure of merit in an on-board NVM.

The method may include receiving one or more optimized secure ranging parameters from the controller and processing subsequently received UWB signals based on the one or more optimized secure ranging parameters. The optimized secure ranging parameters may relate to a change in an estimated noise floor, a back-search time window, and or peak detection thresholds used to detect peaks in the correlation output.

FIG. 6 is a flow diagram outlining an exemplary method 600 for processing STS CLFOM. The method may be performed, for example, by controllers 110, 410 of FIGS. 1 and 4A/4B, respectively or BDC 310 of FIG. 3. The method includes, at 610, receiving, from a UWB receiver device (e.g., 120, 320, 420 of FIGS. 1, 3, 4, respectively), data derived from at least one secure training sequence (STS) confidence level figure of merit (STS CLFOM data). The STS CLFOM data is based on a correlation between a UWB signal received by a first UWB receiver device and a reference STS template. An example correlation output is illustrated in FIG. 2. At 620, the method includes controlling processing of subsequently received UWB signals by UWB receiver devices based on the at least one STS CLFOM.

In some examples, the method includes determining at least one optimized secure ranging parameter based on the at least one STS CLFOM and providing the at least one optimized securing ranging parameter to the UWB receiver device for use in processing received UWB signals. The optimized secure ranging parameters may relate to a change in an estimated noise floor, a back-search time window, and or peak detection thresholds used to detect peaks in the correlation output.

The method may include tagging the STS CLFOM with an indication of a geographic location of the channel to generate tagged STS CLFOM data. The method may then include determining a location of the controller device and controlling operation of the UWB receiver device based on stored geo-tagged STS CLFOM data mapped to the location. For example, different optimized secure ranging parameters may be provided to the UWB receiver device based on a current location of the UWB receiver device.

The method may also include transmitting the geo-tagged STS CLFOM data to a second device that hosts a repository of geo-tagged STS CLFOM data. The second device may be a device, such as a server, implementing a cloud-based service (e.g. 480 of FIGS. 4A and 4B). The cloud-based service may provide subscription-based access to channel condition information on a per location basis that is generated by the cloud-based service based on STS CLFOM received over time from multiple controllers (e.g., multiple vehicles). The method may include requesting channel classification information for a current location of the controller device from the second device and controlling operation of the UWB receiver device based on the channel classification information received from the second device. For example, when channel classification information for a given location is received that indicates a low-noise channel, a noise floor used by anchor devices may be lowered to improve secure ranging performance in terms of speed and power consumption.

The method may include storing the at least one STS CLFOM in the memory; performing statistical analysis on stored STS CLFOM to generate STS SLI data; and controlling processing of subsequently received UWB signals based on STS CLFOM data. In this manner, response to STS CLFOM may be smoothed and trends in channel conditions may be tracked.

FIG. 7 is a flow diagram outlining an exemplary method 700 for providing channel classification information. The method may be performed, for example, by a device implementing the cloud-based service 480 of FIGS. 4A and 4B. The method includes, at 710, receiving geo-tagged STS CLFOM data. The geo-tagged STS CLFOM data characterizes an aspect of one or more secure ranging rounds and is tagged with a geographic location at which the one or more secure ranging rounds were performed. The method includes, at 720, aggregating the received geo-tagged STS CLFOM data based on location to generate channel classification information. Channel classification information may include a quality-based classification regarding an expected level of interference and/or noise at the location. At 730, the method includes, in response to a request for channel classification for a given location, providing channel classification information for the given location. The request for channel classification information may be received from a body domain controller 310 of FIG. 3 or a controller 110, 410 of FIGS. 1 and 4A/4B, respectively.

In some examples the method includes generating the channel classification information by determining a channel characteristic of each location based on the received geo-tagged STS CLFOM data.

In some examples the method includes performing machine learning on the received geo-tagged STS CLFOM data to generate the channel classification information. In some examples the method includes determining whether a source of the request has a subscription; and refraining from providing the channel classification information when the source of the request does not have a subscription.

It can be seen from the foregoing description that the disclosed STS CLFOM allow for characterization of noise levels for channels in which STS UWB signals are received. Secure ranging parameters used to detect peaks in the STS UWB signal may be adapted based on the STS CLFOM. STS CLFOM data may be geo-tagged to allow aggregation of STS CLFOM data based on location. In this manner channel classification information may be developed for use in optimizing secure ranging parameters based on the experienced channel quality for the location.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

Example 1 is a method, including, with a UWB receiver devices, receiving a UWB signal during a ranging round; correlating the received UWB signal with a reference secure training sequence (STS) template to generate a correlation output; determining a distance between a transmitter of the received UWB signal based on the received UWB signal and the UWB receiver device based on the correlation output and one or more secure ranging parameters, wherein the one or more secure ranging parameters are received from a controller device; computing at least one STS confidence level figure of merit (STS CLFOM) for the ranging round based on a main peak to early peak (MPEP) differential of the correlation output, an early peak to noise floor differential of the correlation output, and a noise floor of the correlation output; and providing data indicative of the at least one STS CLFOM to the controller device. The method includes, with the controller device, receiving the data indicative of the at least one STS CLFOM from the UWB receiver device; optimizing the secure ranging parameters based on the at least one STS CLFOM; and transmitting data indicative of the optimized secure ranging parameters to the UWB receiver device for use by the UWB receiver device in processing UWB signals received in subsequent ranging rounds.

Example 2 includes the subject matter of example 1, including or omitting optional elements, wherein the one or more secure ranging parameters include parameters related to a back-search time window, noise floor estimation, or a peak detection threshold.

Example 3 includes the subject matter of any of examples 1-2, including or omitting optional elements, including, with the controller device, tagging the STS CLFOM data with an indication of a geographic location of the controller device to generate geo-tagged STS CLFOM data; and transmitting the geo-tagged STS CLFOM data or data derived from the STS CLFOM data to a second device that hosts a repository of tagged STS CLFOM data.

Example 4 includes the subject matter of any of examples 1-3, including or omitting optional elements, including, with the controller device, requesting channel classification information for a current location of the controller device from a second device; optimizing the secure ranging parameters based on channel classification; and transmitting data indicative of the optimized secure ranging parameters to the UWB receiver device for use by the UWB receiver device in processing UWB signals received in subsequent ranging rounds.

Example 5 is a controller device, including a processor and a memory, the processor configured to, when executing instructions stored in the memory, cause the controller device to, receive data derived from at least one secure training sequence (STS) confidence level figure of merit (STS CLFOM data), wherein the STS CLFOM data is based on a correlation between a UWB signal received by a first UWB receiver device and a reference STS template; and control processing of subsequently received UWB signals based on the data.

Example 6 includes the subject matter of example 5, including or omitting optional elements, wherein the processor is configured to cause the controller device to determine at least one optimized secure ranging parameter based on the data; and provide the at least one optimized securing ranging parameter to a second UWB receiver device for use in processing received UWB signals.

Example 7 includes the subject matter of any of examples 5-6, including or omitting optional elements, wherein the at least one optimized secure ranging parameter includes parameters related to a back-search time window, noise floor estimation, or a peak detection threshold.

Example 8 includes the subject matter of any of examples 5-7, including or omitting optional elements, wherein the processor is configured to cause the controller device receive STS CLFOM data indicative of an STS CLFOM from the first UWB receiver device; tag the STS CLFOM data with an indication of a geographic location of the controller device to generate geo-tagged STS CLFOM data; and transmit the geo-tagged STS CLFOM data or data derived from the STS CLFOM data to a second device that hosts a repository of tagged STS CLFOM data.

Example 9 includes the subject matter of any of examples 5-8, including or omitting optional elements wherein the processor is configured to determine a geographic location of the controller device; and control operation of a second UWB receiver device based on geo-tagged STS CLFOM data mapped to the geographic location.

Example 10 includes the subject matter of any of examples 5-9, including or omitting optional elements, wherein the processor is configured to cause the controller device to request channel classification information for a current location of the controller device from a second device; and control processing of subsequently received UWB signals based on the channel classification information received from the second device.

Example 11 includes the subject matter of any of examples 5-10, including or omitting optional elements, wherein the processor is configured to cause the controller device to determine at least one optimized secure ranging parameter based on the channel classification information; and provide the at least one optimized securing ranging parameter to a second UWB receiver device for use in processing received UWB signals.

Example 12 is an ultra-wideband (UWB) receiver device including a processor and a memory, the processor configured to, when executing instructions stored in the memory, cause the device to receive a UWB signal during a ranging round; correlate the received UWB signal with a reference secure training sequence (STS) template to generate a correlation output; compute at least one STS confidence level figure of merit (STS CLFOM) for the ranging round based on a main peak to early peak (MPEP) differential of the correlation output, an early peak to noise floor differential of the correlation output, and a noise floor of the correlation output; and provide the at least one STS CLFOM to a controller device.

Example 13 includes the subject matter of example 12, including or omitting optional elements, wherein the processor is configured to provide the STS CLFOM periodically or in response to a request from the controller.

Example 14 includes the subject matter of any of examples 12-13, including or omitting optional elements, wherein the processor is configured to cause the device to receive one or more optimized secure ranging parameters from the controller; and process the received UWB signals based on the one or more optimized secure ranging parameters.

Example 15 includes the subject matter of any of examples 12-14, including or omitting optional elements, wherein the one or more optimized secure ranging parameters include parameters related to a back-search time window, noise floor estimation, or a peak detection threshold.

Example 16 is a method, including receiving geo-tagged secure training sequence (STS) confidence level figure of merit (STS CLFOM) data, wherein the STS CLFOM data characterizes an aspect of one or more secure ranging rounds and indicates a location at which the one or more secure ranging rounds were performed; aggregating the received geo-tagged STS CLFOM data based on location to generate channel classification information; and in response to a request for channel classification information for a given location, providing channel classification information for the given location.

Example 17 includes the subject matter of example 16, including or omitting optional elements, including performing machine learning on the received geo-tagged STS CLFOM data to generate the channel classification information.

Example 18 includes the subject matter of any of examples 16-17, including or omitting optional elements, wherein the channel classification information characterizes a relative level of noise or interference associated with the location.

Example 19 includes the subject matter of any of examples 16-18, including or omitting optional elements, including determining a subscription status of a source of the request for channel classification information; and selectively providing the channel classification information based on the subscription status.

Example 20 includes the subject matter of any of examples 16-19, including or omitting optional elements, wherein the channel classification information includes one or more optimized secure ranging parameters include parameters related to a back-search time window, noise floor estimation, or a peak detection threshold associated with the location.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. A method, comprising:

with an ultra-wideband (UWB) receiver device, receiving a UWB signal during a ranging round;

correlating the received UWB signal with a reference secure training sequence (STS) template to generate a correlation output;

determining a distance between a transmitter of the received UWB signal based on the received UWB signal and the UWB receiver device based on the correlation output and one or more secure ranging parameters, wherein the one or more secure ranging parameters are received from a controller device;

computing at least one STS confidence level figure of merit (STS CLFOM) for the ranging round based on a main peak to early peak (MPEP) differential of the correlation output, an early peak to noise floor differential of the correlation output, and a noise floor of the correlation output; and providing data indicative of the at least one STS CLFOM to the controller device, and with the controller device, receiving the data indicative of the at least one STS CLFOM from the UWB receiver device;

optimizing the secure ranging parameters based on the at least one STS CLFOM; and transmitting data indicative of the optimized secure ranging parameters to the UWB receiver device for use by the UWB receiver device in processing UWB signals received in subsequent ranging rounds.

2. The method of claim 1, wherein the one or more secure ranging parameters comprise parameters related to a back-search time window, noise floor estimation, or a peak detection threshold.

3. The method of claim 1, comprising, with the controller device, tagging the STS CLFOM data with an indication of a geographic location of the controller device to generate geo-tagged STS CLFOM data; and transmitting the geo-tagged STS CLFOM data or data derived from the STS CLFOM data to a second device that hosts a repository of tagged STS CLFOM data.

4. The method of claim 1, comprising, with the controller device, requesting channel classification information for a current location of the controller device from a second device;

optimizing the secure ranging parameters based on channel classification; and transmitting data indicative of the optimized secure ranging parameters to the UWB receiver device for use by the UWB receiver device in processing UWB signals received in subsequent ranging rounds.

5. A controller device, comprising a processor and a memory, the processor configured to, when executing instructions stored in the memory, cause the controller device to, receive data derived from at least one secure training sequence (STS) confidence level figure of merit (STS CLFOM data), wherein the STS CLFOM data is based on a main peak to early peak (MPEP) differential of a correlation between a UWB signal received by a first ultra-wideband (UWB) receiver device and a reference STS template, an early peak to noise floor differential of the correlation, and a noise floor of the correlation; and control processing of subsequently received UWB signals based on the data.

6. The controller device of claim 5, wherein the processor is configured to cause the controller device to determine at least one optimized secure ranging parameter based on the data; and provide the at least one optimized secure ranging parameter to a second UWB receiver device for use in processing received UWB signals.

7. The controller device of claim 6, wherein the at least one optimized secure ranging parameter comprises parameters related to a back-search time window, noise floor estimation, or a peak detection threshold.

8. The controller device of claim 5, wherein the processor is configured to cause the controller device to receive STS CLFOM data indicative of an STS CLFOM from the first UWB receiver device;

tag the STS CLFOM data with an indication of a geographic location of the controller device to generate geo-tagged STS CLFOM data; and transmit the geo-tagged STS CLFOM data or data derived from the STS CLFOM data to a second device that hosts a repository of tagged STS CLFOM data.

9. The controller device of claim 5, wherein the processor is configured to determine a geographic location of the controller device; and control operation of a second UWB receiver device based on geo-tagged STS CLFOM data mapped to the geographic location.

10. The controller device of claim 5, wherein the processor is configured to cause the controller device to request channel classification information for a current location of the controller device from a second device; and control processing of subsequently received UWB signals based on the channel classification information received from the second device.

11. The controller device of claim 10, wherein the processor is configured to cause the controller device to determine at least one optimized secure ranging parameter based on the channel classification information; and provide the at least one optimized secure ranging parameter to a second UWB receiver device for use in processing received UWB signals.

12. An ultra-wideband (UWB) receiver device comprising a processor and a memory, the processor configured to, when executing instructions stored in the memory, cause the device to:

receive a UWB signal during a ranging round;

correlate the received UWB signal with a reference secure training sequence (STS) template to generate a correlation output;

compute at least one STS confidence level figure of merit (STS CLFOM) for the ranging round based on a main peak to early peak (MPEP) differential of the correlation output, an early peak to noise floor differential of the correlation output, and a noise floor of the correlation output; and provide the at least one STS CLFOM to a controller device.

13. The UWB receiver device of claim 12, wherein the processor is configured to provide the STS CLFOM periodically or in response to a request from the controller.

14. The UWB receiver device of claim 12, wherein the processor is configured to cause the device to receive one or more optimized secure ranging parameters from the controller; and process the received UWB signals based on the one or more optimized secure ranging parameters.

15. The UWB receiver device of claim 14, wherein the one or more optimized secure ranging parameters comprise parameters related to a back-search time window, noise floor estimation, or a peak detection threshold.

16. A method, comprising:

receiving geo-tagged secure training sequence (STS) confidence level figure of merit (STS CLFOM) data, wherein the STS CLFOM data is based on a main peak to early peak (MPEP) differential of a correlation between a UWB signal received by a first ultra-wideband (UWB) receiver device and a reference STS template, an early peak to noise floor differential of the correlation, and a noise floor of the correlation, wherein the STS CLFOM data characterizes an aspect of one or more secure ranging rounds and indicates a location at which the one or more secure ranging rounds were performed;

aggregating the received geo-tagged STS CLFOM data based on location to generate channel classification information; and in response to a request for channel classification information for a given location, providing channel classification information for the given location.

17. The method of claim 16, comprising performing machine learning on the received geo-tagged STS CLFOM data to generate the channel classification information.

18. The method of claim 16, wherein the channel classification information characterizes a relative level of noise or interference associated with the location.

19. The method of claim 16, comprising determining a subscription status of a source of the request for channel classification information; and selectively providing the channel classification information based on the subscription status.

20. The method of claim 16, wherein the channel classification information comprises one or more optimized secure ranging parameters comprising parameters related to a back-search time window, noise floor estimation, or a peak detection threshold associated with the location.

* * * * *